G. GORMAN.
FAUCET.
No. 191,848. Patented June 12, 1877.
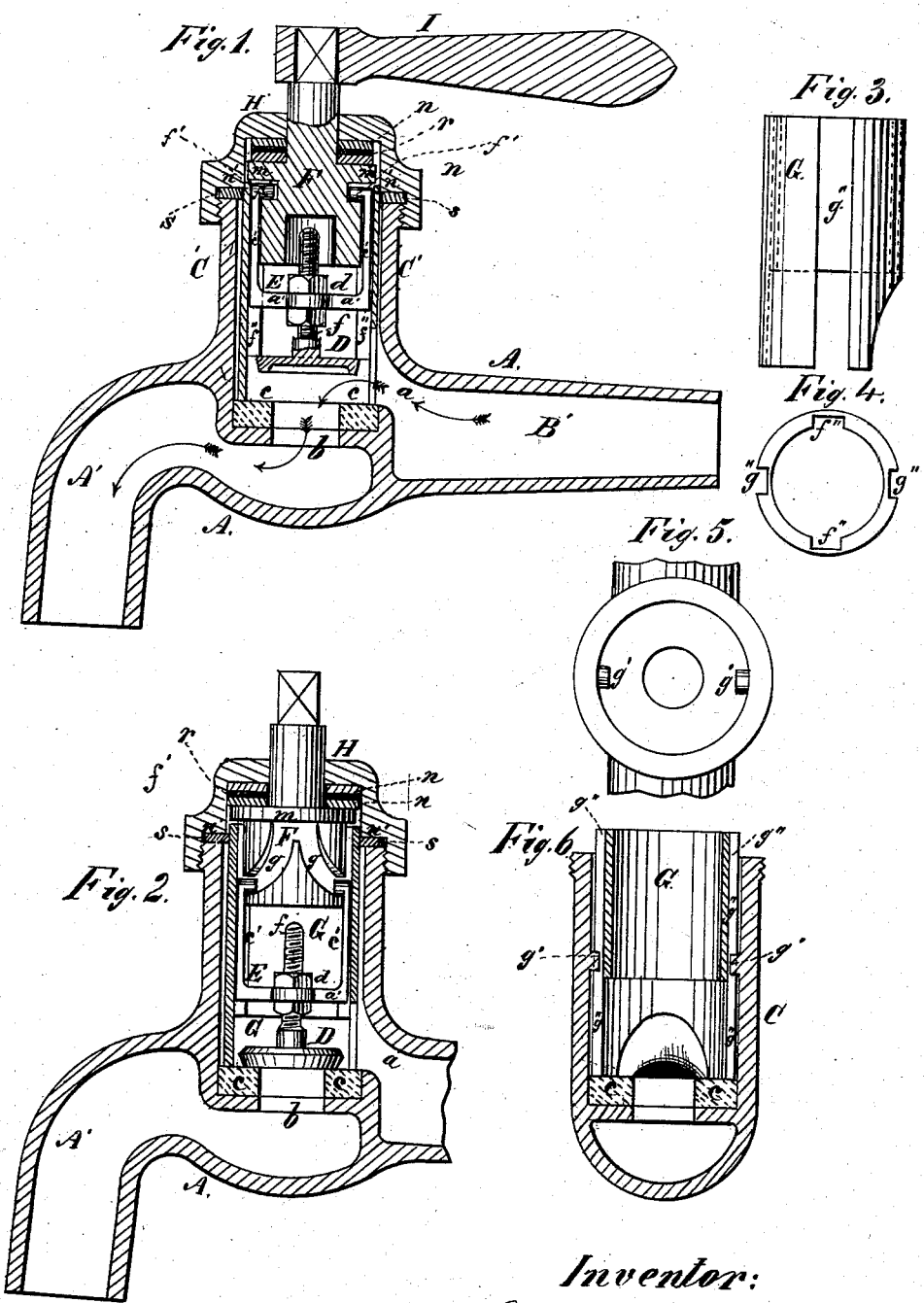
Witnesses:
Henry Eichling
Edward Holly
Inventor:
George Gorman
per James A. Whitney
Atty.

UNITED STATES PATENT OFFICE.

GEORGE GORMAN, OF NEW YORK, N. Y., ASSIGNOR OF ONE-HALF HIS RIGHT TO WILLIAM G. BENT, OF SAME PLACE.

IMPROVEMENT IN FAUCETS.

Specification forming part of Letters Patent No. 191,848, dated June 12, 1877; application filed August 15, 1876.

*To all whom it may concern:*

Be it known that I, GEORGE GORMAN, of the city, county, and State of New York, have invented certain Improvements in Cocks or Faucets, of which the following is a specification:

The object of this invention is to provide a faucet or stop-cock which can be made ready for use and sale without any of the finishing (commonly so termed) hitherto required in the construction of such devices, my invention enabling the several parts of the faucet or stop-cock to be cast to shape and fitted and put together to complete the whole without filing, turning, or the like, by which means I am enabled to provide a cock fully as efficient, durable, and convenient as any hitherto made, at a mere fraction of the cost ordinarily involved.

The invention comprises the combination of a peculiarly-constructed barrel, having a suitable water-way and packed or elastic valve-seat, an internal sleeve acting as the guide for a vertically-moving valve, whereby motion is given to said valve to close and open the water-way, a hanger carrying the said valve, and a cam-grooved actuating-block, in which the hanger is itself suspended to receive motion vertically from the axial movement of the actuating-block, the several parts constructed and arranged in such relation with each other as to fit together with sufficient snugness without filing, turning, or like finishing, and yet be capable of such accurate co-operation as to operate the valve to and from the packed valve-seat by a quarter-turn (more or less) of the actuating-block, to quickly and tightly close the water-way when required, and to quickly and widely open the same when an outflow through the faucet or stop-cock is desired.

The invention further comprises a novel combination, with the hanger, arranged within the body or vertical part of the barrel, and operated by the actuating-block, of a nut and screw, whereby the valve may be adjusted at a greater or less distance from the hanger, to cause it to press with greater or less force against the valve-seat when the actuating-block is turned to close the water-way.

The invention further comprises, in combination with the barrel, and with the actuating-block actuating the valve, as hereinbefore explained, of a screw-cap, duplicate packing-rings, and an intermediate metallic washer, whereby provision is made for the turning of the actuating-block to operate the valve without undue friction upon the packing-rings, which otherwise would soon wear out and cause the faucet to leak.

The invention further comprises a novel combination of the hereinbefore-specified sleeve with the packed valve-seat, whereby the displacement of said valve-seat from the cavity in which it is placed is effectually guarded against.

Figure 1 is a central longitudinal section of a faucet made according to my invention, showing the valve lifted to permit the outflow of the liquid through the water-way. Fig. 2 is a similar view of the same, showing the valve depressed to close the said water-way. Fig. 3 is a side view of the internal sleeve forming part of my improved faucet, and Fig. 4 is a top or end view of the faucet-sleeve. Fig. 5 is a detached view of the vertical portion of the barrel with the cap removed; and Fig. 6 is a central longitudinal sectional view of said vertical portion of the barrel, taken in a plane at right angles to Figs. 1 and 2.

For convenience of description the faucet is herein referred to as used in a horizontal position; but it is manifest that the relation of the parts comprising the said faucet will remain the same in whatever position or for whatever use said faucet may be used.

A is the peculiarly-constructed barrel, comprising the bib A', the tail B', and the vertical part or body C', the tail B' communicating with the body C' by the passage $a$, and with the bib A' and water-way $b$. Surrounding the upper part of this latter is the packing $c$, which constitutes the elastic yielding or packed seat of the valve D. This valve D is formed upon the lower end of a screw, $f$, which works through a nut, $d$, on the lower end or cross-piece $a'$ of a hanger, E. This hanger E has, at the opposite ends of its cross-piece $a'$, two parallel arms, $c'$, which extend upward past the lower part of the actuating-block F.

Upon the upper extremities of these arms $c'$ are inwardly-turned lugs $f'$, which fit into the cam-grooves $g$ (more clearly represented in Fig. 2) of the block F. These cam-grooves extend in opposite directions from each of the opposite sides of the block F, and by turning the block F in one direction with the other the hanger E, and consequently the valve D, will be raised or lowered, according as the upward or downward slopes of said cam-grooves $g$ are in position to act upon the lugs $f'$ of the hanger E. It is to be understood that the valve D, the hanger E, and the actuating-block F play within a sleeve, G, placed within the body $C'$ of the barrel, and kept from turning within the said barrel by inwardly-projecting studs $g'$, which project inward from the inner surface of the barrel, and fit into longitudinal grooves $g''$, formed on opposite sides of the sleeve G. In like manner the hanger E is kept from turning within the sleeve by reason of its lateral portions or arms $c'$ moving in grooves $f'''$ formed internally in the said sleeve. At the upper part of the block F is a flange or circumferential rib, $m$, which rests upon the top of the sleeve E, which latter forms the lower support or bearing of the block F. Upon the upper part of the body $C'$ is screwed the screw cap H, through which projects the stem $F'$, to the upper or outer part of which is attached the lever or handle I, for operating the valve. Between the flange $m$ and the inner surface of the top of this cap are provided the two packing-rings $n$, between which is placed the annular metallic washer $r$. When the cap H is screwed down upon the body $C'$ the packing-rings $n$ are compressed, and the flange $m$ is brought down snugly upon its bearing upon the upper end of the seleve G.

It will be observed that by interposing the metallic washer $r$ between the two packing-rings $n$, which latter may be of india-rubber, leather, or other suitable material, said packing-rings, instead of rubbing against each other with great friction when the actuating-block F is turned, rub simply in contact with the smooth surface of the metallic washer $r$, undue wear of said packing-rings being by this means prevented.

It should be observed that, in order to render the joint between the cap H and the body $C'$ perfectly tight, a packing-ring, $s$, should be placed upon the top of the body $C'$, so as to be pressed between the shoulder $n'$ of the cap H and the said top of the body $C'$, thereby rendering the joint perfectly tight. It is furthermore to be particularly observed that the lower edge or end of the sleeve E rests upon the periphery of the packed seat $c$, the latter being fitted into an annular cavity formed concentric with the water-way $b$, to receive said packed seat $c$. The sleeve E therefore holds the packed seat $c$ down to its place without danger of the latter being from any cause drawn or thrown upward, which would interfere with the proper working of the faucet or stop-cock.

In the operation of the faucet or stop-cock, as thus constructed, it is only necessary to give a quarter-turn to the actuating-block F by means of its handle I to cause the downward slopes of the groove $g$ in said block to force downward the valve D snugly upon its packed seat $c$ to close the water-way, when an equal turn in the opposite direction will lift the valve to open said water-way. It will furthermore be borne in mind that, by turning the valve itself with reference to the hanger E, its screw $f$ will be screwed inward or downward from the end $d$, to bring the valve D at such distance from said end $d$—in other words, from the lower part of the hanger—as is required to force the valve D against the packed valve-seat $c$ with the degree of pressure or snugness required.

What I claim as my invention is—

1. The barrel A, comprising the combination of the bib $A'$, the tail $B'$, and the body $C'$, and constructed water-way $b$, and packed or valve seat $c$, with the internal elastic sleeve G, serving as a guide for the valve D, the hanger E, carrying the said valve, and the actuating-block F, constructed with the cam-groove $g$, the said parts being constructed and arranged, in relation with each other, substantially as and for the purpose herein set forth.

2. The combination of the hanger E, arranged within the body or vertical part $C'$ of the barrel A, and for operation by the actuating-block F, with the nut $d$ and screw $f$, substantially as and for the purpose herein set forth.

3. The combination, with the barrel A and the actuating-block F, arranged to actuate the valve D by means of the cam-grooves $g$, as set forth, the screw-cap H, the duplicate packing-rings $n$, and the intermediate metallic washer $r$, all substantially as and for the purpose herein set forth.

4. The combination, in a faucet substantially as herein set forth, of the sleeve G and the packed valve-seat $c$, substantially as and for the purpose herein set forth.

GEO. GORMAN.

Witnesses:
H. WELLS, Jr.,
EDWARD HOLLY.